United States Patent
Feng et al.

(10) Patent No.: US 10,540,212 B2
(45) Date of Patent: Jan. 21, 2020

(54) DATA-LOCALITY-AWARE TASK SCHEDULING ON HYPER-CONVERGED COMPUTING INFRASTRUCTURES

(71) Applicant: International Business Machines Corporation, Armonk, NY (US)

(72) Inventors: Shuo Feng, Beijing (CN); Tian Feng, Beijing (CN); Xin Wang, Beijing (CN); Zheng Cai Yuan, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/232,076

(22) Filed: Aug. 9, 2016

(65) Prior Publication Data

US 2018/0046503 A1    Feb. 15, 2018

(51) Int. Cl.
 *G06F 9/455* (2018.01)
 *G06F 9/50* (2006.01)
(52) U.S. Cl.
 CPC .......... *G06F 9/5077* (2013.01); *G06F 9/5033* (2013.01)
(58) Field of Classification Search
 None
 See application file for complete search history.

(56) References Cited

U.S. PATENT DOCUMENTS

| | | | | |
|---|---|---|---|---|
| 7,996,636 B1* | 8/2011 | Prakash | ................ | G06F 3/0619 711/162 |
| 8,332,862 B2 | 12/2012 | Isard | | |
| 9,268,808 B2 | 2/2016 | Muthukkaruppan et al. | | |
| 2010/0058023 A1* | 3/2010 | Tan | ........................ | G06F 3/0605 711/202 |

(Continued)

OTHER PUBLICATIONS

Fan, Xiaoyi, "Dependency-aware Data Locality for MapReduce", B.Eng., Beijing University of Posts and Telecommunications, 2013, Thesis Submitted in Partial Fulfillment of the Requirements for the Degree of Master of Science in the School of Computing Science Faculty of Applied Sciences, © Xiaoyi Fan 2015, Simon Fraser University, Fall 2015, 53 pages.

(Continued)

*Primary Examiner* — Dong U Kim
(74) *Attorney, Agent, or Firm* — Bryan D. Wells

(57) ABSTRACT

Data-locality-aware task scheduling on hyper-converged computing infrastructures is provided. A plurality of data blocks referenced in an input/output (I/O) request are identified. The I/O request is based on scheduling logic that executes within a container that is deployed on a hyper-converged infrastructure. A block-location mapping table is scanned using a data block identifier that is associated with a present data block of the plurality of data blocks. Physical node(s) of the hyper-converged infrastructure that store the present data block are identified. A container-instance mapping table is scanned using one or more physical node identifiers that are associated with the physical node(s) that (Continued)

store the present data block. Container(s) deployed on physical node(s) that store the present data block are identified. The scheduling logic is provided with a list of identifier(s) that are respectively associated with the containers that are deployed on the physical node(s) that store the present data block.

20 Claims, 10 Drawing Sheets

(56) References Cited

U.S. PATENT DOCUMENTS

| | | | | |
|---|---|---|---|---|
| 2012/0131025 | A1* | 5/2012 | Cheung | G06F 17/30082 707/755 |
| 2013/0339298 | A1* | 12/2013 | Muller | G06F 17/30283 707/640 |
| 2013/0339966 | A1 | 12/2013 | Meng et al. | |
| 2014/0059310 | A1 | 2/2014 | Du et al. | |
| 2014/0188825 | A1* | 7/2014 | Muthukkaruppan | G06F 17/30339 707/694 |
| 2014/0282578 | A1 | 9/2014 | Teller | |
| 2014/0358944 | A1* | 12/2014 | Brower, Jr. | G06F 17/30861 707/748 |
| 2015/0120928 | A1 | 4/2015 | Gummaraju et al. | |
| 2015/0205819 | A1* | 7/2015 | Brand | G06F 17/30194 707/694 |
| 2016/0196215 | A1* | 7/2016 | Ogihara | G06F 12/0893 711/128 |

OTHER PUBLICATIONS

Lowe, Scott, "VMware VSAN vs the Simplicity of Hyperconvergence", Last Update: Dec. 9, 2013, Wikibon, 13 pages, © Wikibon 2008-2016, <http://wikibon.org/wiki/v/VMware_VSAN_vs_the_Simplicity_of_Hyperconvergence>.

Palanisamy et al., "Purlieus: Locality-aware Resource Allocation for MapReduce in a Cloud", SC '11, 11 pages, Nov. 12-18, 2011, Seattle, Washington, USA, Copyright 2011 ACM 978-1-4503-0771-0/11/11.

"Converged infrastructure", From Wikipedia, the free encyclopedia, This page was last modified on Mar. 4, 2016, 2 pages, <https://en.wikipedia.org/wiki/Converged_infrastructure>.

"Docker (software)", From Wikipedia, the free encyclopedia, This page was last modified on Apr. 14, 2016, 4 pages, <https://en.wikipedia.org/wiki/Docker_(software)>.

"Hadoop Data Locality Change for Virtualization Environment", Retrieved on Apr. 20, 2016, <https://www.google.co.in/url?sa=t&rct=j&q=&esrc=s&source=web&cd=5&cad=rja&uact=8&ved=0ahUKEwjxlqXd4pTLAhVJB44KHV4QAOIQFgg7MAQ&url=https%3A%2F%2Fraw.githubusercontent.com%2Fwiki%2Fvmware-bdc%2Fhadoop-common-topology%2Fproposal.pdf&usg=AFQjCNEoBw7ob48sgTYOTauBnJO35hQCOQ&bvm=bv.115339255,d.c2E>, 6 pages.

Mell et al., "The NIST Definition of Cloud Computing", Recommendationsof theNational Institute of Standards and Technology, NIST Special Publication 800-145, Computer Security DivisionInformation Technology Laboratory, National Institute of Standards and Technology, Gaithersburg, MD 20899-8930, Sep. 2011, 7 pages.

* cited by examiner

| NODE ID | CONTAINER ID | CONTAINER IP | HOST NAME | DIRECTORY |
|---|---|---|---|---|
| Node1 | Node1_contain1 | 192.168.1.1 | Vm_container1 | /cluster1 |
| | Node1_contain2 | 192.168.2.1 | Vm_container2 | /cluster2 |
| Node2 | Node2_contain1 | 192.168.1.2 | Vm_container3 | /cluster1 |
| | Node2_contain2 | 192.168.2.2 | Vm_container4 | /cluster2 |
| Node3 | Node3_contain1 | 192.168.1.3 | Vm_container5 | /cluster1 |
| | Node3_contain2 | 192.168.2.3 | Vm_container6 | /cluster2 |

DATA-LOCALITY-AWARE TASK SCHEDULING ON HYPER-CONVERGED COMPUTING INFRASTRUCTURES

TECHNICAL FIELD

The present invention relates generally to task scheduling, and more particularly, to facilitating data-locality-aware task scheduling on hyper-converged computing infrastructures.

BACKGROUND

Convergence is a concept in the field of information technology that describes the pooling and sharing of infrastructure resources. A converged infrastructure, for example, can include computer processing resources, computer data storage resources, networking resources, and management resources in a single, unified system. In general, a converged infrastructure facilitates the sharing of resources among multiple workloads and clients to advantageously increase resource-utilization rates, decrease capital costs, and decrease management costs. A hyper-converged infrastructure can further reduce costs and increase system flexibility by virtualizing computing resources on commodity hardware and software.

SUMMARY

According to one embodiment of the present invention, a method for facilitating data-locality-aware task scheduling on hyper-converged computing infrastructures is provided. The method includes: identifying, by one or more computer processors, a plurality of data blocks referenced in an input/output (I/O) request that is based on scheduling logic that executes within a container that is deployed on a hyper-converged infrastructure; scanning, by one or more computer processors, a block-location mapping table using a data block identifier that is associated with a present data block of the plurality of data blocks, and in response, identifying, by one or more computer processors, one or more physical nodes of the hyper-converged infrastructure that store the present data block; scanning, by one or more computer processors, a container-instance mapping table using one or more respective physical node identifiers that are associated with the one or more physical nodes that store the present data block, and in response, identifying, by one or more computer processors, one or more containers that are deployed on the one or more physical nodes that store the present data block; and providing, by one or more compute processors, the scheduling logic with a list of one or more container identifiers that are respectively associated with the one or more one or more containers that are deployed on the one or more physical nodes that store the present data block.

According to another embodiment of the present invention, a computer program product for facilitating data-locality-aware task scheduling on hyper-converged computing infrastructures is provided. The computer program product comprises a computer readable storage medium and program instructions stored on the computer readable storage medium. The program instructions include: program instructions to identify a plurality of data blocks referenced in an input/output (I/O) request that is based on scheduling logic that executes within a container that is deployed on a hyper-converged infrastructure; program instructions to scan a block-location mapping table using a data block identifier that is associated with a present data block of the plurality of data blocks, and in response, identify one or more physical nodes of the hyper-converged infrastructure that store the present data block; program instructions to scan a container-instance mapping table using one or more respective physical node identifiers that are associated with the one or more physical nodes that store the present data block, and in response, identify one or more containers that are deployed on the one or more physical nodes that store the present data block; and program instructions to provide the scheduling logic with a list of one or more container identifiers that are respectively associated with the one or more one or more containers that are deployed on the one or more physical nodes that store the present data block.

According to another embodiment of the present invention, a computer system for facilitating data-locality-aware task scheduling on hyper-converged computing infrastructures is provided. The computer system includes one or more computer processors, one or more computer readable storage media, and program instructions stored on the computer readable storage media for execution by at least one of the one or more processors. The program instructions include: program instructions to identify a plurality of data blocks referenced in an input/output (I/O) request that is based on scheduling logic that executes within a container that is deployed on a hyper-converged infrastructure; program instructions to scan a block-location mapping table using a data block identifier that is associated with a present data block of the plurality of data blocks, and in response, identify one or more physical nodes of the hyper-converged infrastructure that store the present data block; program instructions to scan a container-instance mapping table using one or more respective physical node identifiers that are associated with the one or more physical nodes that store the present data block, and in response, identify one or more containers that are deployed on the one or more physical nodes that store the present data block; and program instructions to provide the scheduling logic with a list of one or more container identifiers that are respectively associated with the one or more one or more containers that are deployed on the one or more physical nodes that store the present data block.

DETAILED DESCRIPTION

Figure 1:
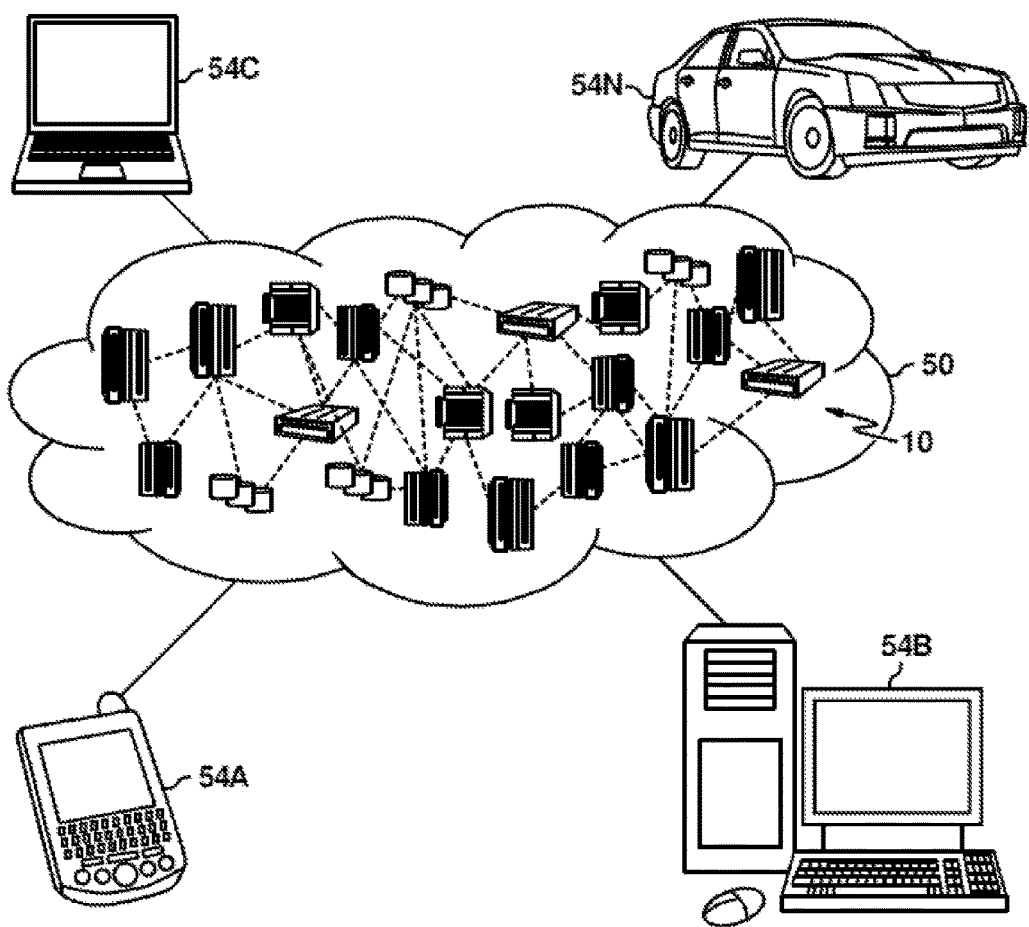
FIG. 1 depicts a cloud computing environment, in accordance with an embodiment of the present invention.

Embodiments of the present invention recognize that is advantageous to reduce network traffic, and thus network latencies, among networked computing resources in order to, for example, reduce job execution time with respect to jobs that are distributed across the computing resources. In particular, it is recognized that network latency is a significant factor in determining job execution times with respect to "big data" analytical software that analyzes very large structured or unstructured datasets via parallel processing. Embodiments of the present inventions also recognize that one technique for reducing the network traffic incurred while analyzing a very large dataset that is distributed over many computing nodes is to divide the job into tasks and to schedule the tasks such that, to the greatest extent possible, each task executes on a computing node that stores the data required to execute the respective task. As used herein, this technique is referred to as "data-locality-aware task scheduling." While hyper-converged infrastructures utilizing commodity hardware and software are increasing cost-effective for the analysis of very large datasets via parallel-processing applications executing within virtualized user-spaces, embodiments of the present invention further recognize that data-locality-aware task scheduling is not always possible due to the abstraction of user-space file systems over the distributed file system utilized by the underlying commodity hardware. As described herein, embodiments of the present invention provide logical resources that facilitate data-locality-aware task scheduling with respect to parallel-processing applications executing within virtualized user-spaces on a hyper-converged infrastructure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as, server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as, a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 illustrates a cloud computing environment according to an embodiment of the present invention. As shown, illustrative cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Computing nodes 10 may communicate with one another. They may be grouped (not shown) physically or virtually, in one or more networks, such as, Private, Community, Public or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
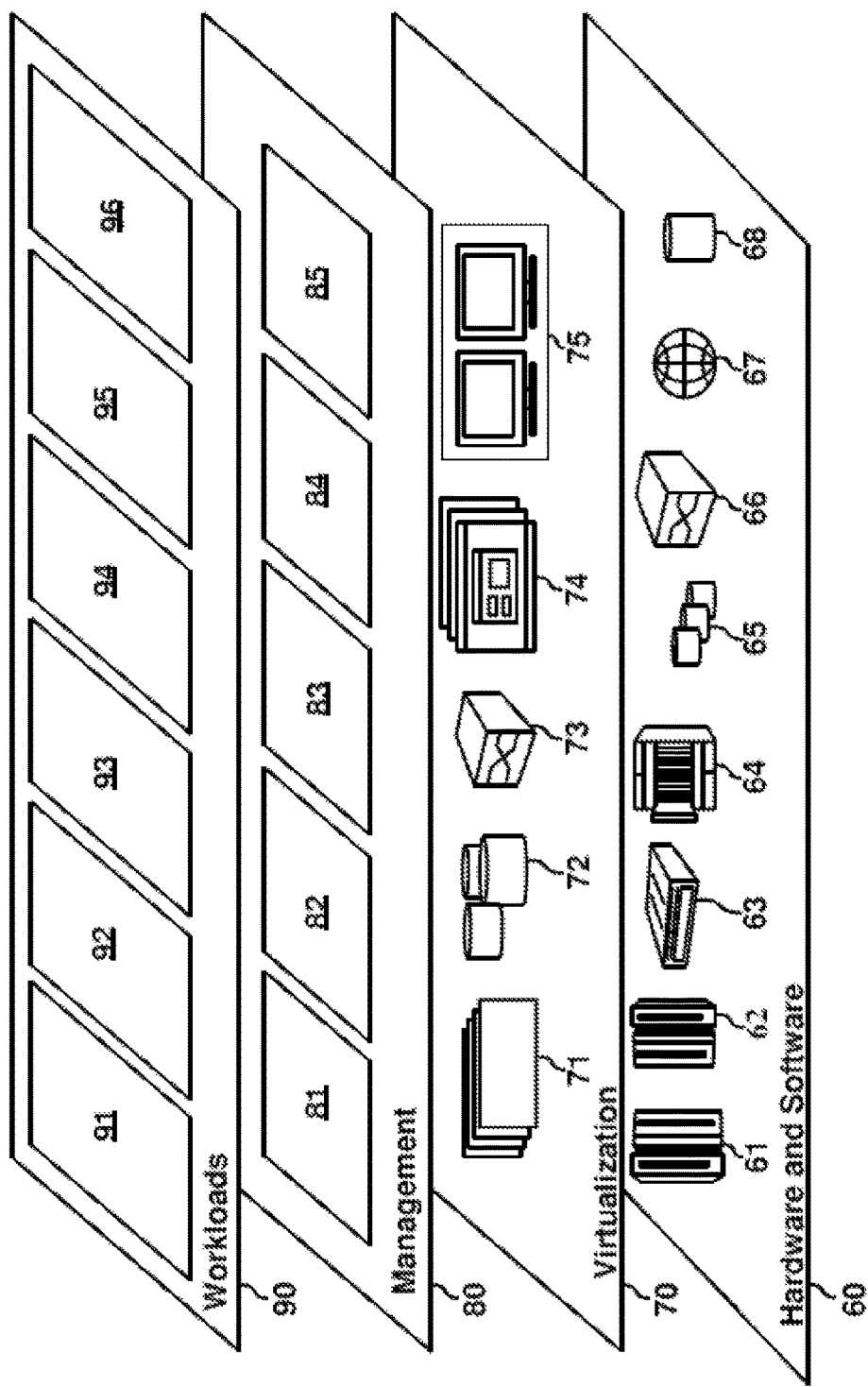
FIG. 2 depicts abstraction model layers, in accordance with an embodiment of the present invention.

FIG. 2 illustrates abstraction model layers according to an embodiment of the present invention and comprises a set of functional abstraction layers provided by cloud computing environment 50 (FIG. 1). It should be understood in advance that the components, layers and functions shown in FIG. 2 are intended to be illustrative only and embodiments of the present invention are not limited thereto. As depicted, the following layers and corresponding functions are provided:

Hardware and software layer 60 includes hardware and software components representing a hyper-converged infrastructure. Examples of hardware components include: mainframes 61; RISC (Reduced Instruction Set Computer) architecture based servers 62; servers 63; blade servers 64; storage devices 65; and networks and networking components 66. Software components can include network application server software 67 and database software 68. In some embodiments, database software 68 includes software as described with respect to FIGS. 3-9 for providing data-locality-aware task scheduling on the hyper-converged infrastructure.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In some embodiments, virtual clients 75 represent isolated user-space instances (i.e., containers) that, in conjunction with one or more components of database software 68, facilitate data-locality-aware task scheduling, as described herein.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. In some embodiments, data analytics processing 94 represents instances of analytical software generating jobs for which data-locality-aware task scheduling is provided for respective tasks, as described herein.

Figure 3:
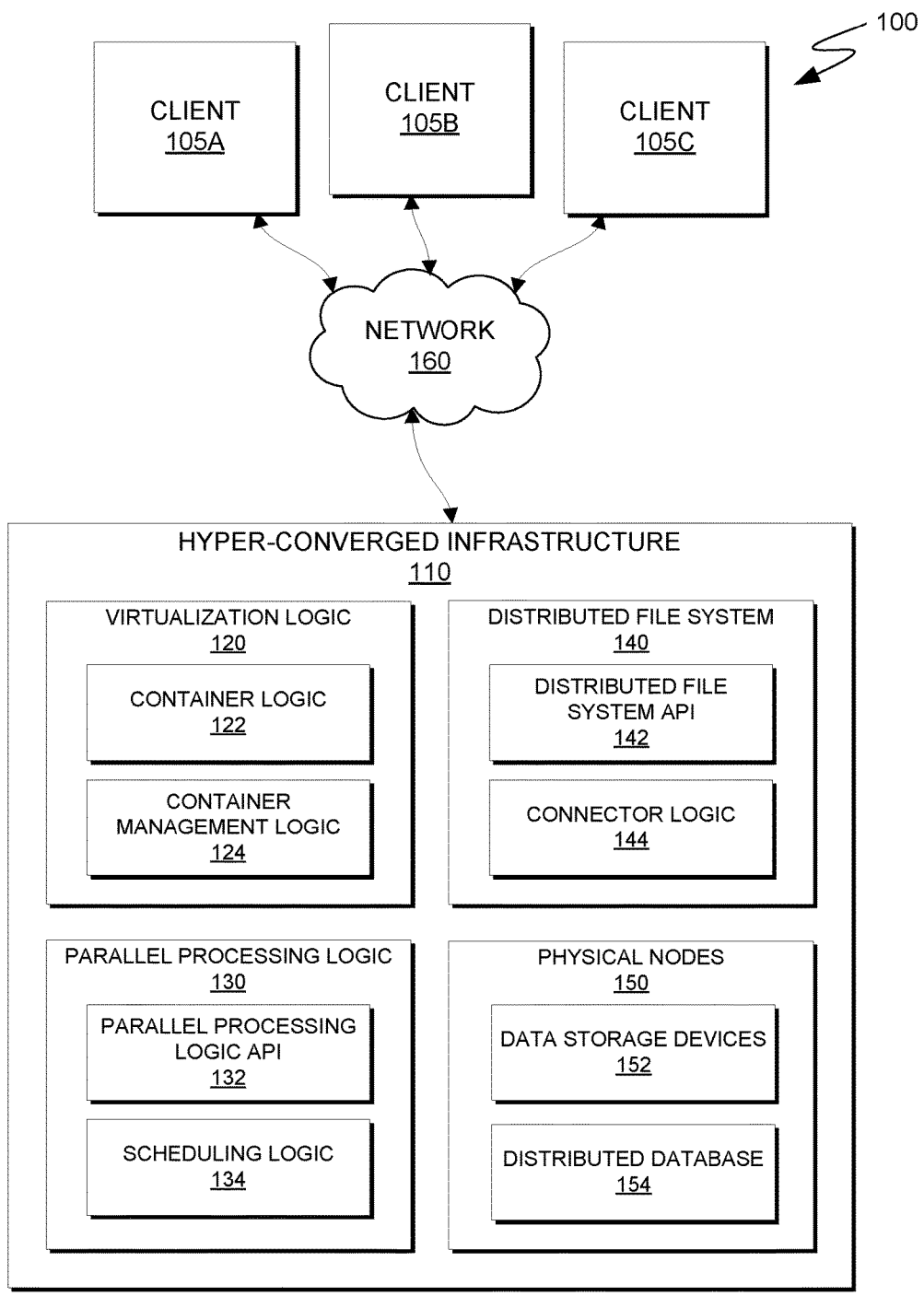
FIG. 3 is a functional block diagram illustrating a backup environment, in accordance with an embodiment of the present invention.

FIG. 3 is a functional block diagram illustrating a computing environment, in accordance with an embodiment of the present invention. For example, FIG. 3 is a functional block diagram illustrating computing environment 100. Computing environment 100 includes client 105A, client 105B, client 105C, which are collectively referred to as clients 105, and hyper-converged infrastructure 110. Network 160 communicatively connects clients 105 and hyper-converged infrastructure 110. Hyper-converged infrastructure 110 includes various resources and logic for hosting virtualized resources and storing computer data generated, at least in part, in response to operations of the hosted, virtualized resources. In the embodiment depicted in FIG. 3, for example, hyper-converged infrastructure 110 includes virtualization logic 120, parallel processing logic 130, distributed file system 140 and physical nodes 150. In the embodiment of hyper-converged infrastructure 110 depicted in FIG. 3, virtualization logic 120 includes container logic 122 and container management logic 124, parallel processing logic 130 includes parallel processing logic application program interface (parallel processing logic API) 132 and scheduling logic 134, distributed file system 140 includes distributed file system application program interface (distributed file system API) 142 and connector logic 144, and physical nodes 150 include data storage devices 152 and distributed database 154.

In various embodiments, client 105A is a computing device that can be a standalone device, a server, a laptop computer, a tablet computer, a netbook computer, a personal computer (PC), or a desktop computer. In another embodiment, client 105A represents a computing system utilizing clustered computers and components to act as a single pool of seamless resources. In general, client 105A can be any computing device or a combination of devices with access to hyper-converged infrastructure 110 via network 160. Client 105B and client 105C are analogous to client 105A. Client 105A, client 105B, and client 105C are collectively referred to as clients 105, and clients 105 can include one or more types of computing devices. Clients 105 can include internal and external hardware components, as depicted and described in further detail with respect to FIG. 9. In general, clients 105 are computing devices that provide, via network 160, one or both of instructions and data to hyper-converged infrastructure 110 such that hyper-converged infrastructure 110 deploys virtualized resources on physical nodes 150 as described herein.

Network 160 can be, for example, a local area network (LAN), a wide area network (WAN) such as the Internet, or a combination of the two, and may include wired, wireless, fiber optic or any other connection known in the art. In general, network 160 can be any combination of connections and protocols that will support communications between clients 105 and hyper-converged infrastructure 110, in accordance with an embodiment of the present invention.

In various embodiments, hyper-converged infrastructure 110 represents a computing environment that includes physical and virtual resources for managing and deploying workloads on physical nodes 150. Hyper-converged infrastructure 110 is representative of cloud computing node(s) 10 in some embodiments of the present invention. Additionally, physical nodes 150 can represent commodity computing hardware and software that provides, at least in part, hyper-converged infrastructure 110 with characteristics that are associated with a hyper-converged framework, as will be understood by persons having ordinary skill in the art. In other embodiments, physical nodes 150 represent a plurality of networked computing resources, wherein each node can be a standalone device, a server, a laptop computer, a tablet computer, a netbook computer, a personal computer (PC), a desktop computer, a personal digital assistant (PDA), a smart phone, or any programmable electronic device capable of executing tasks in accordance with data-locality-aware task scheduling, as described herein. In yet other embodiments, one or more nodes of physical nodes 150 represents a computing system utilizing clustered computers and components to act as a single pool of seamless resources. In general, each node of physical nodes 150 is a computing resource that is capable of executing tasks in accordance with data-locality-aware task scheduling, as described herein. Each node of physical nodes 150 can include components as described with respect to FIG. 9. In various embodiments, physical nodes 150 are communicatively connected via a dedicated inter-node network (not shown) such as a local area network (LAN), a wide area network (WAN) such as the Internet, or a combination of the two. The network connecting physical nodes 150 can include wired, wireless, fiber optic or any other connection known in the art. In some embodiments, hyper-converged infrastructure 110 includes additional computing resources (not shown) to manage physical nodes 150 and provide an interface for clients 105 (i.e., one or more management nodes).

In the embodiment depicted in FIG. 3, data storage devices 152 represent a collection of computer readable data storage devices. Data storage devices 152 can include one or more hard disk drives, one or more solid-state drives, one or more tape drives, one or more optical disc drives, or any combination of the aforementioned data storage devices or any other type of data storage device known in the art. In general, each data storage device of data storage devices 152 is associated with a respective node of physical nodes 150. In some embodiments, one or more data storage devices are directly attached to respective nodes of physical nodes 150. In other embodiments, one or more data storage devices are communicatively connected to respective nodes of physical nodes 150 via a storage area network (SAN) or as network-attached-storage (NAS). Collectively, data storage devices 152 store distributed database 154. Distributed database 154 is a distributed data repository that instances of parallel processing logic 130 can read from and/or write to in order to execute, in parallel, tasks associated with jobs received from one or more clients of clients 105. In some embodiments, distributed database 154 can be written to and read by programs and entities outside of computing environment 100 in order to populate the repository with data.

In the embodiment depicted in FIG. 3, hyper-converged infrastructure 110 utilizes distributed file system 140 to read and write data and/or metadata to distributed database 154. In some embodiments, distributed file system 140 advantageously provides "striping" and replication of data over physical nodes 150 and respective data storage devices to respectively decrease read/write latencies and increase resiliency, as discussed in greater detail with respect to FIGS. 7A and 7B. In various embodiments, distributed file system 140 is a portable operating system interface (POSIX) compliant distributed and/or clustered file system. In general, distributed file system 140 is a file system that is mounted directly on physical nodes 150 and provides one or more networked nodes with concurrent access to files stored distributed over the networked nodes. In the embodiment depicted in FIG. 3, distributed file system API 142 receives requests for data and/or metadata associated with information stored in distributed database 154 and connector logic 144 facilitates, at least in part, data-locality-aware task scheduling, as described herein.

In the embodiment depicted in FIG. 3, hyper-converged infrastructure 110 utilizes virtualization logic 120 to provide containers in which instances of parallel processing logic 130 can execute, as described herein. In general, virtualization logic 120 represents logic for providing and managing isolated user-space environments on physical nodes 150 (i.e., operating-system-level virtualization on physical nodes 150). In the embodiment depicted in FIG. 3, virtualization logic 120 includes container logic 122 and container management logic 124. Container logic 122 is logic that provides an abstracted user-space over operating system kernels of physical nodes 150. Each node of physical nodes 150 can store an instance of container logic 122 and execute container logic 122 to provide one or more respective user-spaces (i.e., containers) to applications executing on hyper-converged infrastructure 110. In general, container logic 122 is any type of logic for providing and managing isolated user-space environment on physical nodes 150. In the embodiment depicted in FIG. 3, container management logic 124 represents logic for managing the deployment of containers among physical nodes 150, as will be discussed in greater detail with respect to FIGS. 4-8. In some embodiments, physical nodes 150 include one or more "management" nodes that manage the deployment of containers on physical nodes 150. For example, a management node executing container management logic 124 can deploy a plurality of nodes on hyper-converged infrastructure 110, organize the deployed nodes into clusters of containers (i.e., virtualized resource clusters), and generate data and/or metadata to facilitate data-locality-aware task scheduling, as described herein.

In the embodiment depicted in FIG. 3, hyper-converged infrastructure 110 utilizes parallel processing logic 130 to advantageously execute jobs submitted by clients 105 via instances of parallel processing logic 130 executing within respective containers on physical nodes 150. In general, parallel processing logic 130 provides a logical framework that includes features for dividing jobs received from clients 105 into tasks, distributing the tasks among instances of parallel processing logic 130 executing within respective containers on physical nodes 150, executing the distributed tasks in parallel, and storing any resulting data and/or metadata to, at least in part, distributed database 154 on data storage devices 152. On hyper-converged infrastructure 110, instances of parallel processing logic 130 can execute within respective containers that are virtualized, via container logic 122, on respective nodes of physical nodes 150.

In the embodiment depicted in FIG. 3, parallel processing logic 130 includes parallel processing logic API 132 to, at least in part, facilitate data-locality-aware task scheduling, as described herein. Because virtualization logic 120 provides at least one layer of abstraction between parallel processing logic 130 and (i) the underlying operating-system running on physical nodes 150 and (ii) the file system used to store data and/or metadata on data storage devices 152 (i.e., distributed file system 140), parallel processing logic 130 can utilize a virtual file system. In general, parallel processing logic 130 is, at least in part, logic that utilizes a virtualized, distributed file system to store data (e.g., a data-set associated with a parallel processing job) when executing within containers deployed on hyper-converged infrastructure 110. As described herein, parallel processing logic API 132 can, in conjunction with connector logic 144 and distributed file system API 142, provide a bridge between a virtualized, distributed file system and distributed file system 140.

In the embodiment depicted in FIG. 3, parallel processing logic 130 includes scheduling logic 134. In general, scheduling logic 134 represents logic for scheduling tasks on instances of parallel processing logic 130 executing within respective containers on physical nodes 150. In some embodiments, each cluster of nodes in physical nodes 150 includes a "master" node that executes scheduling logic 134 and schedules tasks among respective "worker" nodes. In other embodiments, the previously described management node executes scheduling logic 134 for each cluster of nodes in physical nodes 150 (i.e., each virtual resource cluster) and schedules jobs among the clusters of nodes and tasks within each cluster of nodes. In some embodiments, scheduling logic 134 interfaces with parallel processing logic 130 but is not integrated with parallel processing logic 130.

To reduce network traffic among physical nodes 150 during execution of a job, it is advantageous for scheduling logic 134 to schedule tasks based, at least in part, on the locality of the data and/or metadata required to execute respective tasks. As previously stated, this type of task scheduling is herein referenced as "data-locality-aware" scheduling. When tasks are scheduled using data-locality-aware task scheduling, to the extent possible, task scheduling logic 134 schedules tasks such that the instances of parallel processing logic 130 that are scheduled to execute the respective tasks run on the physical nodes that store, or are closest to, the data and/or metadata required to execute the respective tasks. Data-locality-aware task scheduling, however, requires that scheduling logic 134 have the ability to obtain data-locality information (i.e., identify how the information stored in distributed database 154 data is distributed over physical nodes 150). If, however, parallel processing logic 130 is configured to utilize a virtual file system, the ability to obtain data-locality information from distributed file system 140 can be lost. In various embodiments of the present invention, connector logic 144 facilitates data-locality-aware task scheduling, at least in part, by interfacing with parallel processing logic API 132 and distributed file system API 142 to provide scheduling logic 134 with data-locality information, as described with respect to FIGS. 4-8.

Figure 4:
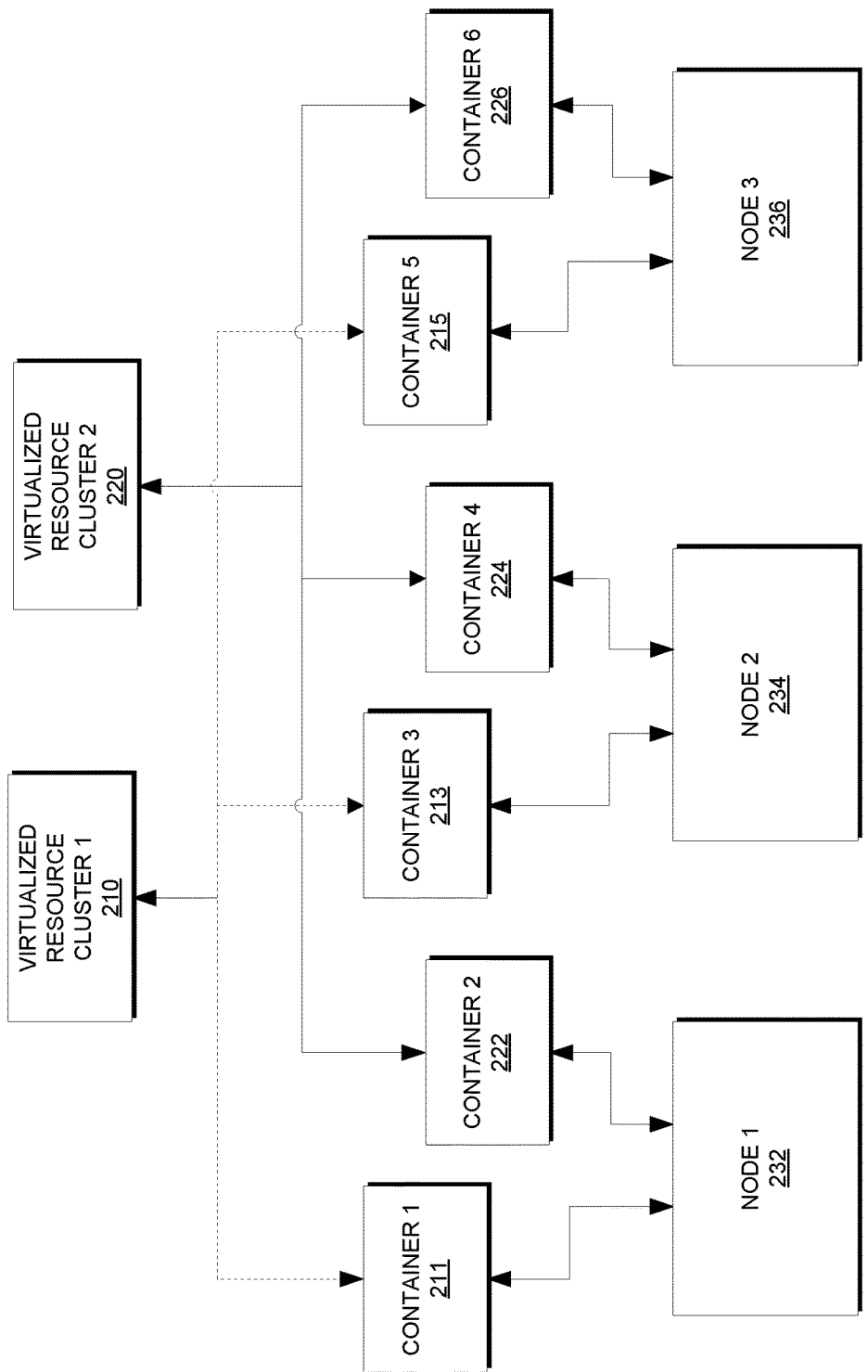
FIG. 4 is a block diagram depicting two virtualized resource clusters that are deployed on a plurality of physical nodes of a hyper-converged infrastructure, in accordance with an embodiment of the present invention.

FIG. 4 is a block diagram depicting two virtualized resource clusters that are deployed on a plurality of physical nodes of a hyper-converged infrastructure, in accordance with an embodiment of the present invention. Various embodiments of the present invention include different numbers and arrangements of physical nodes, virtualized containers, and virtualized resource clusters than the embodiment depicted in FIG. 4.

In the embodiment depicted in FIG. 4, container management logic 124 deploys six containers over three nodes of physical nodes 150: node 232 (referenced herein as "node 1"); node 234 (referenced herein as "node 2"); and node 236 (referenced herein as "node 2"). Node 1 hosts container 211 (referenced herein as "container 1") and container 222 (referenced herein as "container 2"). Node 2 hosts container 213 (referenced herein as "container 3") and container 224 (referenced herein as "container 4"). Node 3 hosts container 215 (referenced herein as "container 5") and container 226 (referenced herein as "container 6"). Virtualized resource cluster 210 (referenced herein as "virtualized resource cluster 1") comprises containers 1, 3, and 5, and virtualized resource cluster 220 (referenced herein as "virtualized resource cluster 2") comprises containers 2, 4, and 6. In the embodiment depicted in FIG. 4, a respective instance of parallel processing logic 130 can execute in each of containers 1, 2, 3, 4, 5, and 6 such that the instances executing within containers 1, 3, 5 execute tasks associated with a first job scheduled on virtualized resource cluster 1 and the instances executing within containers 2, 4, and 6 execute tasks associated with a second job scheduled on virtualized resource cluster 2.

As described herein, it is advantageous for scheduling logic 134 to schedule tasks on the instances of parallel processing logic 130 executing within containers 1, 2, 3, 4, 5, and 6 utilizing data-locality-aware task scheduling. In the embodiment depicted in FIG. 4, a preferred implementation of data-locality-aware task scheduling would indicate that (i) node 1 stores data and/or metadata required to execute tasks scheduled on the respective instances of parallel processing logic 130 executing within containers 1 and 2, (ii) node 2 stores data and/or metadata required to execute tasks scheduled on the respective instances of parallel processing logic 130 executing within container 3 and 4, and (iii) node 3 stores data and/or metadata required to execute tasks scheduled on the respective instances of parallel processing logic 130 executing within containers 5 and 6. As previously stated, however, the ability of scheduling logic 134 to obtain data-locality information from distributed file system 140

Figure 5:
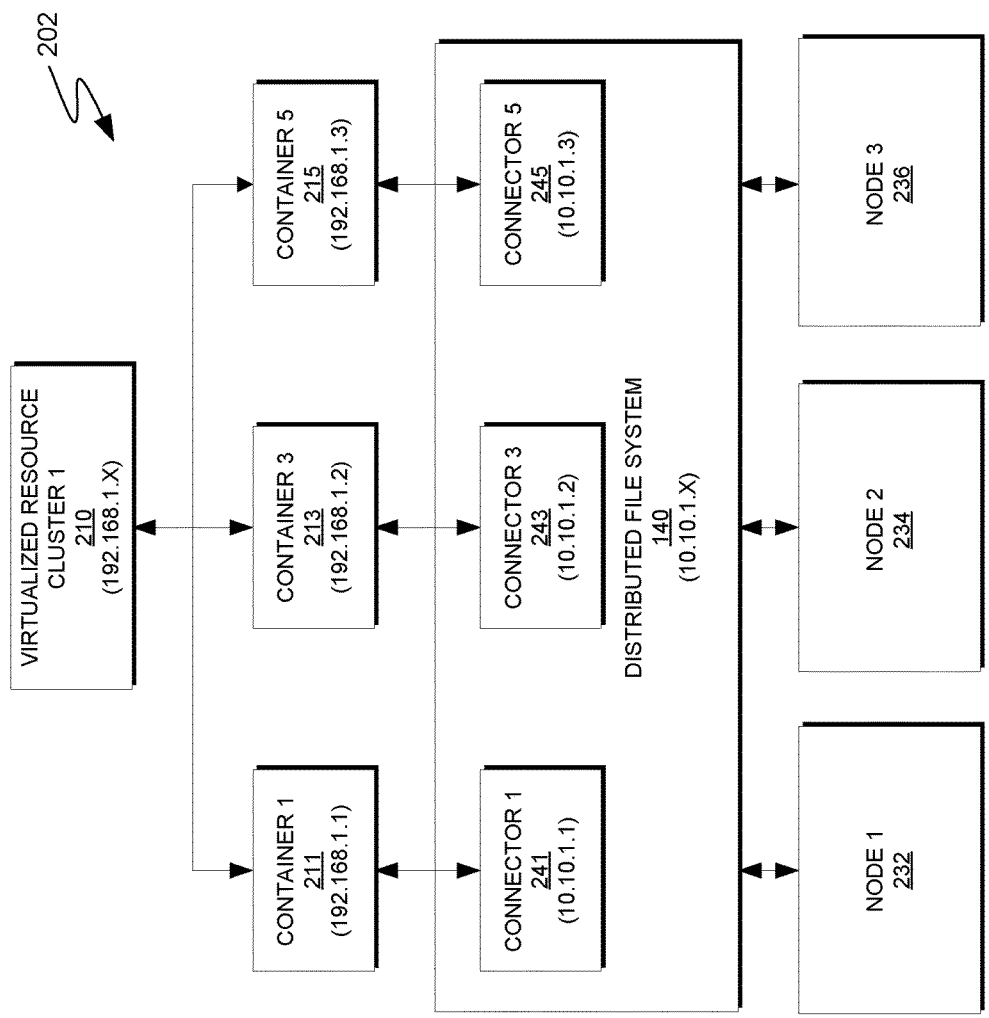
FIG. 5 is a block diagram depicting connectors that, to facilitate data-locality-aware task scheduling, interface with instances of an application executing within containers deployed on a hyper-converged infrastructure, in accordance with an embodiment of the present invention.

(e.g., data and/or metadata identifying the information stored on nodes 1, 2, and 3) can be lost when parallel processing logic 130 is configured to utilize a virtual file system. FIG. 5 depicts, in part, how connector logic 144 facilitates data-locality-aware task scheduling with respect to virtualizes resource cluster 1.

FIG. 5 is a block diagram depicting connectors that, to facilitate data-locality-aware task scheduling, interface with instances of an application executing within containers deployed on a hyper-converged infrastructure, in accordance with an embodiment of the present invention. More specifically, FIG. 5 depicts an embodiment in which virtualized resource cluster 1, as depicted in FIG. 4, interfaces with distributed file system 140, which manages data and/or metadata stored on nodes 1, 2, and 3 of physical nodes 150. As depicted in FIG. 5, connector logic 122 deploys connector 241 (referenced herein as "connector 1"), connector 243 (referenced herein as "connector 3"), and connector 245 (referenced herein as "connector 5") to monitor the network (e.g., the 10.10.1.X network referenced in FIG. 5) that distributed file system 140 uses to transfer data among data storage devices 152 of physical nodes 150. In the depicted embodiment, connectors 1, 3, and 5 respectively interface with containers 1, 3, and 5 using virtual network addresses of the respective containers (e.g., the addresses on the 192.168.1.X network referenced in FIG. 5). To facilitate data-locality-aware task scheduling, connector logic 144 provides each of connectors 1, 3, and 5, in response to receiving a query for data-locality information from an instance of scheduling logic 134, with data-locality information from distributed file system 140 over the 10.10.1.X network. Additionally, scheduling logic 134 translates the data-locality information in order to schedule tasks among the containers of virtualized resource cluster 1, as discussed in greater detail with respect to FIGS. 7A, 7B, and 8. While instances of parallel processing logic 130 respectively execute scheduled tasks within containers 1, 3, 5, connectors 1, 3, and 5 interface with respective instances of parallel processing logic API 132 and distributed file system API 142 to provide containers 1, 3, and 5 with the ability to complete input/output (I/O) operations via distributed file system 140.

Figures 6A, 6B:
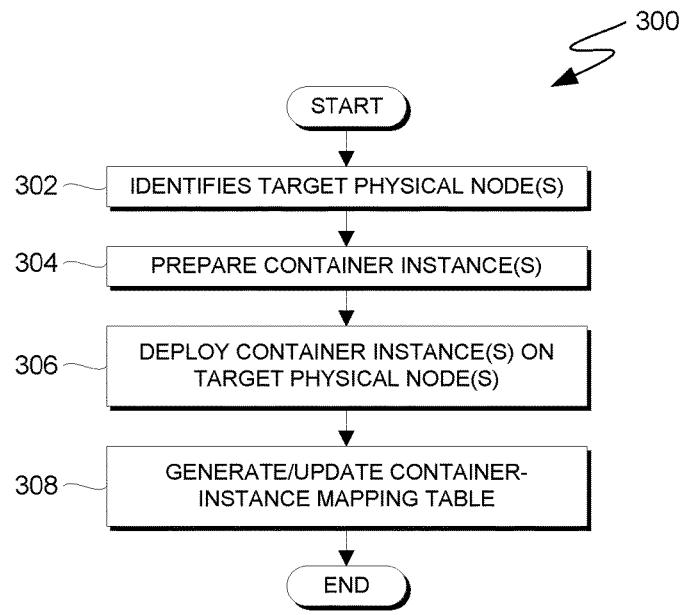
FIG. 6A is a flowchart depicting operations for generating a container-instance mapping table, in accordance with an embodiment of the present invention.
FIG. 6B is an example of a container-instance mapping table, in accordance with an embodiment of the present invention.

FIG. 6A is a flowchart depicting operations for generating a container-instance mapping table, in accordance with an embodiment of the present invention. More specifically, FIG. 6A is a flowchart depicting operations 300 of container management logic 124 within computing environment 100. Embodiments of the present invention utilize a container-instance mapping table to associate containers with the physical nodes on which the containers are deployed. One example of a container-instance mapping table will be discussed with respect to FIG. 6B. In some embodiments, parallel processing logic 130 requests that virtualization logic 120 deploy containers on physical nodes 150 in response to hyper-converged infrastructure 110 receiving a job from one of clients 105.

In the embodiment depicted in FIG. 6A, container management logic 124 identifies one or more target physical nodes (i.e., nodes on which container management logic 124 will deploy containers) from among physical nodes 150 (302). In various embodiments, container management logic identifies target physical nodes based on the availability of various computing resources among physical nodes 150, computing resources that the client associated with the requested job is authorized to use, or other factor(s) or any combination of factors, as will be understood by persons having ordinary skill in the art.

In the embodiment depicted in FIG. 6A, container management logic 124 prepares one or more container instances for deployment on the one or more target physical nodes (304). In various embodiments, preparing the one or more container instances includes determining how the target physical nodes are to allocate, to respective containers, processor resources, memory resources, network resources, libraries, or other computing resource(s) or any combination of resources, as will be understood by persons having ordinary skill in the art.

In the embodiment depicted in FIG. 6A, container management logic 124 deploys the one or more container instances on respective target physical nodes (306). In various embodiments, container management logic 124 deploys the one or more container instances by, at least in part, issuing instructions to the respective target physical nodes that instruct instances of virtualization logic 120 executing thereon to initialize containers in accordance with properties identified in operation 304.

In the embodiment depicted in FIG. 6A, container management logic 124 generates or updates a container-instance mapping table (308). In some embodiments, container management logic 124 generates the container-instance mapping table based on the identities of the target physical node(s) and the identities of the respective container(s) deployed thereon, as determined via operations 300. In other embodiments, container management logic 124, or another logical component of hyper-converged infrastructure 110, generates or updates a container-instance mapping table in operation 308 by executing one or more scripts on physical nodes 150 to (i) identify each node of physical nodes 150 and (ii) monitor and/or log processes executed by respective, hosted containers (e.g., scripts utilizing commanded including "ps-elf" and "grep" Linux commands with respect to containers) in order to identify the containers based on an associated IP address (e.g., an IP address on the 192.168.1.X network referenced in FIG. 5), a host name, or another identifier or combination of identifiers returned by the one or more scripts.

FIG. 6B is an example of a container-instance mapping table, in accordance with an embodiment of the present invention. More specifically, FIG. 6B depicts container-instance mapping table 310, which associates the containers depicted in FIG. 4 with the physical nodes on which they are deployed. Container-instance mapping table 310 includes column 312, which indicates node identifiers (ID(s)) IDs, column 314, which indicates containers IDs, column 316, which indicates Container IP addresses based on the 192.168.1.X network depicted in FIG. 5, column 318, which indicates host names, and column 320, which indicates the directories (i.e., directory IDs associated with the respective virtualized resource clusters) that are associated with the various containers. Container-instance mapping table 310 represents just one example of a container-instance mapping table, and other embodiments of the present invention can utilize container mapping tables that include additional and/or different type(s) of information and/or that are organized in different manners without departing from the scope of the present invention. As discussed in greater detail with respect to FIG. 8, container-instance mapping tables facilitate, at least in a part, data-locality-aware task scheduling by enabling connector logic 144 to provide data-locality information to instance(s) of parallel processing logic 130 and instance(s) of scheduling logic 134 executing within containers on physical nodes 150.

Figure 7A:
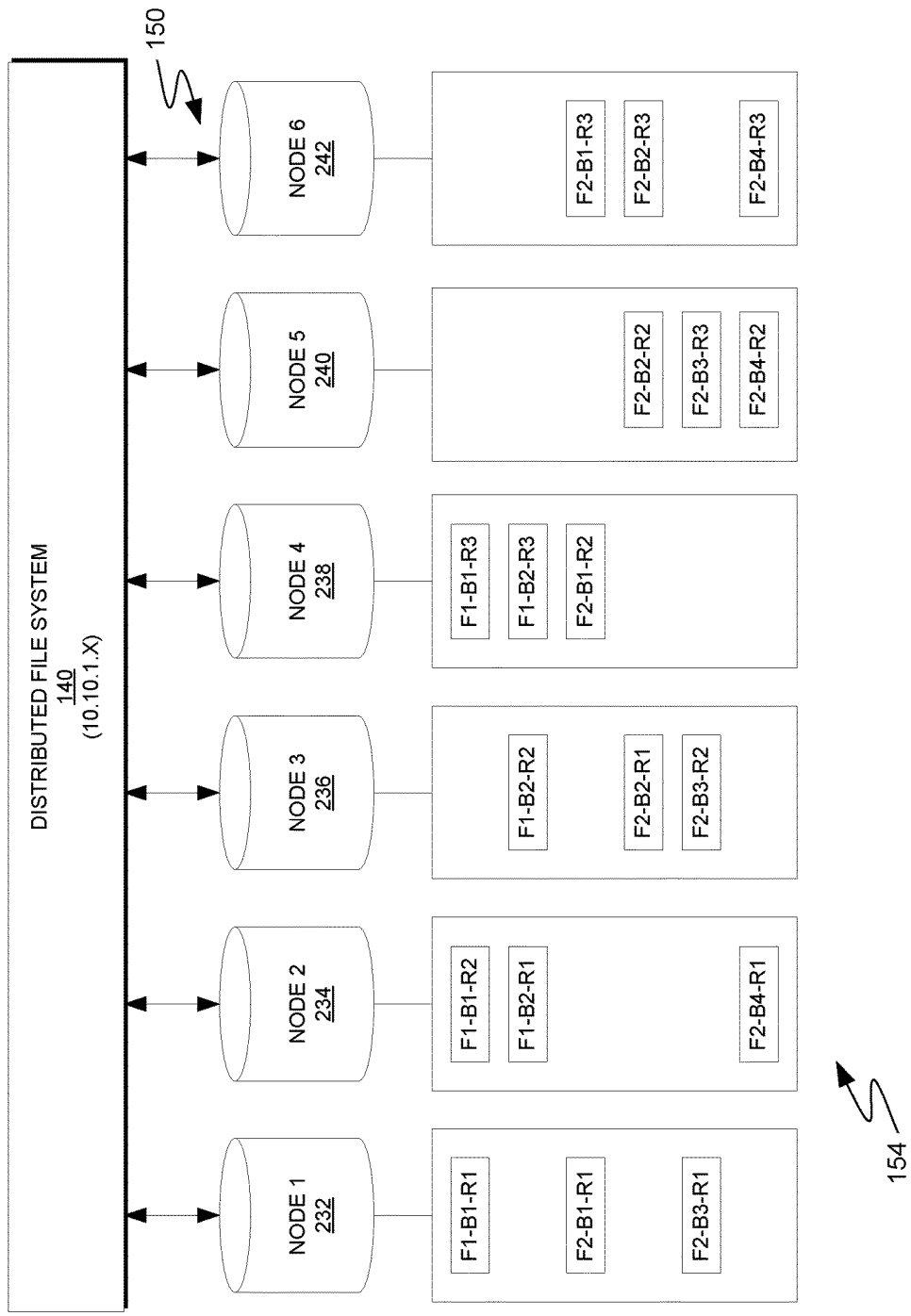
FIG. 7A is a block diagram depicting an example of data distributed over a plurality of nodes based on a distributed file system, in accordance with an embodiment of the present invention.
Figure 7B:
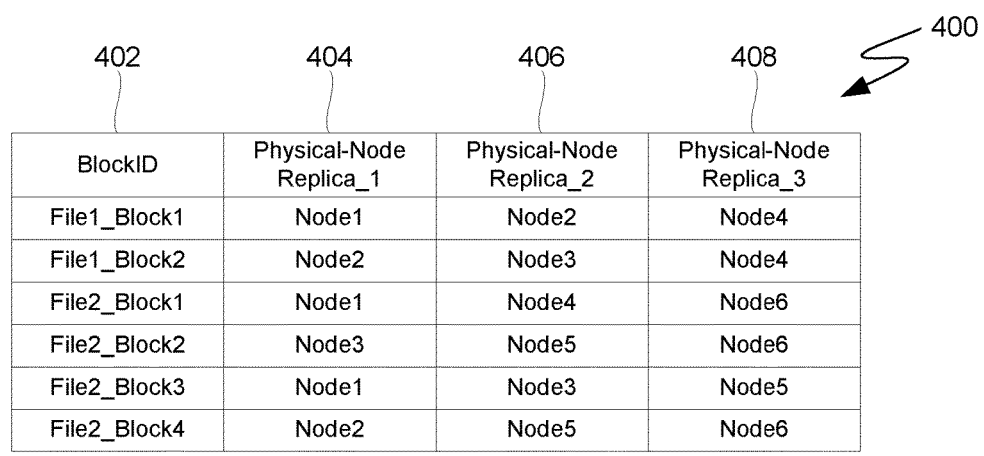
FIG. 7B is an example of a block-location mapping table, in accordance with an embodiment of the present invention.

FIG. 7A is a block diagram depicting an example of data distributed over a plurality of nodes based on a distributed file system, in accordance with an embodiment of the present invention. More specifically, FIG. 7A depicts a first file and a second file that are distributed over six nodes of physical nodes 150, in accordance with distributed file system 140. In the embodiment depicted in FIG. 7A, distributed file system 140 distributes files over six nodes of physical nodes 150: node 232 (referenced herein as "node 1"); node 234 (referenced herein as "node 2"); node 236 (referenced herein as "node 3"); node 238 (referenced herein as "node 4"); node 240 (referenced herein as "node 5"); and node 242 (referenced herein as "node 6"). To write a file to distributed database 154, distributed file system 140 stripes files into blocks based on a data block size, replicates each block three times, and, for each block, distributes the replicated blocks across three nodes of physical nodes 150 in the embodiment depicted in FIG. 7A. In FIG. 7A, for example, a first file is striped into two blocks and each block is replicated three times such that: a first replica of the first block is represented as "F1-B1-R1" on node 1; a second replica of the first block is represented as "F1-B1-R2" on node 2; a third replica of the first block is represented as "F1-B1-R3" on node 4; a first replica of the second block is represented as "F1-B2-R1" on node 2; a second replica of the second block is represented as "F1-B2-R2" on node 3; and a third replica of the second block is represented as "F1-B2-R3" on node 4. Similarly, a second file is striped into three blocks (i.e., the second file is larger than the first file) and each block is replicated three times such that: a first replica of the first block is represented as "F2-B1-R1" on node 1; a second replica of the first block is represented as "F2-B1-R2" on node 4; a third replica of the first block is represented as "F2-B1-R3" on node 6; a first replica of the second block is represented as "F2-B2-R1" on node 3; a second replica of the second block is represented as "F2-B2-R2" on node 5; a third replica of the second block is represented as "F2-B2-R3" on node 6; a first replica of the third block is represented as "F2-B3-R1" on node 2; a second replica of the third block is represented as "F2-B3-R2" on node 5; and a third replica of the third block is represented as "F2-B3-R3" on node 6. In some embodiments, distributed file system 140 maintains a block-location mapping table that describes how files are distributed among physical nodes 150 to facilitate, at least in part, data-locality-aware task scheduling of tasks on hyper-converged infrastructure 110, as described herein. FIG. 7B, for example, is a block-location mapping table that describes the distribution of the blocks depicted in FIG. 7A.

FIG. 7B is an example of a block-location mapping table, in accordance with an embodiment of the present invention. More specifically, block-location mapping table 400 describes the distribution of the blocks depicted in FIG. 7A. Block-location mapping table 400 includes column 402, which indicates the block ID of each block managed by distributed file system 140, column 404, which indicates the node IDs of the physical nodes that store the first replica of each block (i.e., the node IDs referenced in container-instance mapping table that maps the containers to the physical nodes on which they are deployed), column 406, which indicates the node IDs of the physical nodes that store the second replica of each block, and column 408, which indicates the node IDs of the physical nodes that store the third replica of each block. In general, a block-location mapping table that maps blocks of data, or other units of data, to the physical nodes on which the blocks of data are stored. Block-location mapping table 400 is just one example of a block-location mapping table, and other embodiments of the present invention can utilize block-location mapping tables that include additional and/or different type(s) of information than block-location mapping table 400 and that are organized differently than block-location mapping table 400 without departing from the scope of the present invention. As discussed in greater detail with respect to FIG. 8, block-location mapping tables facilitate, at least in a part, data-locality-aware task scheduling by enabling connector logic 144 to provide data-locality information to instances of parallel processing logic 130 and instance(s) of scheduling logic 134 executing within containers on physical nodes 150.

Figure 8:
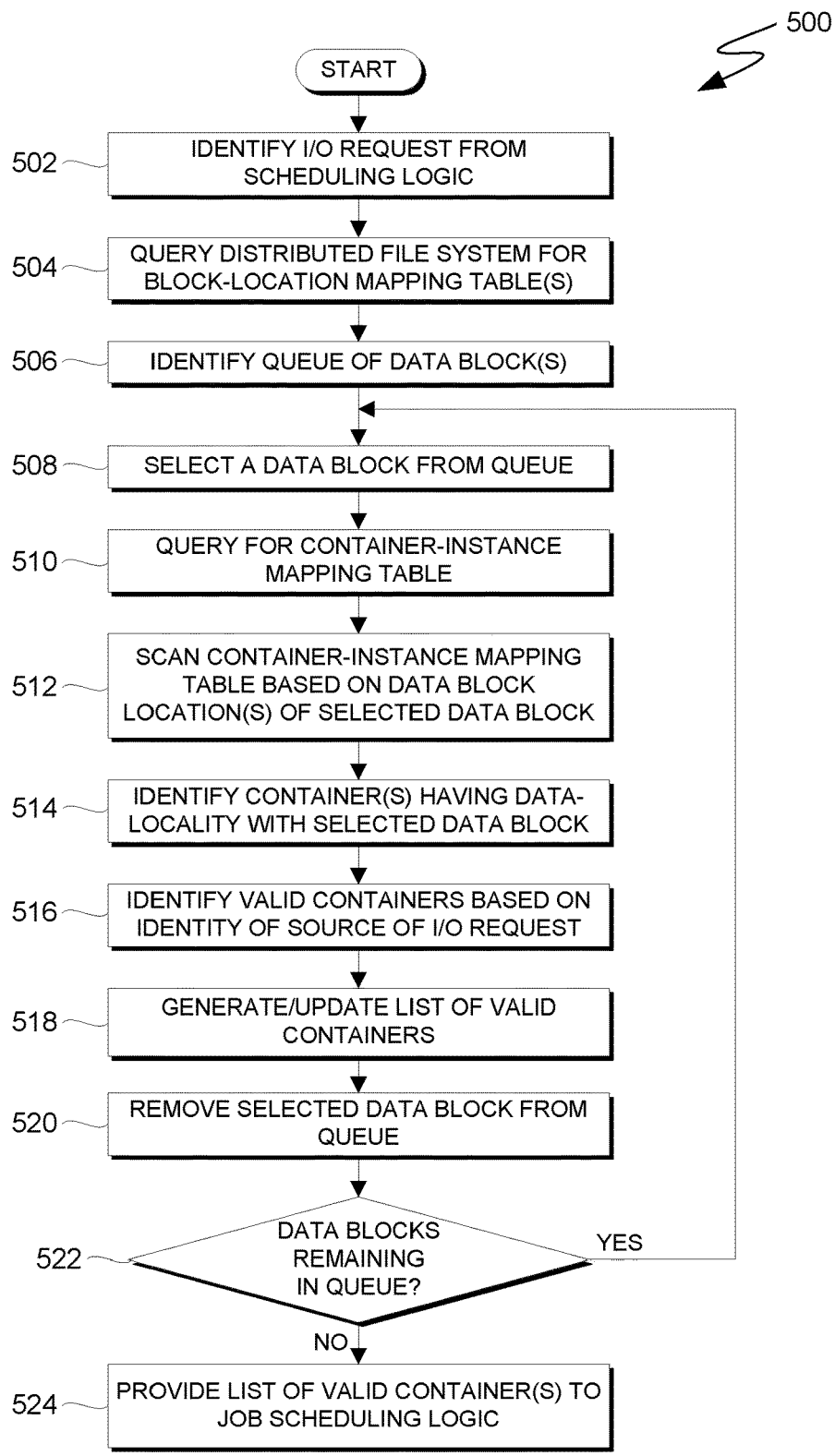
FIG. 8 is a flowchart depicting operations to facilitate data-locality-aware task scheduling, in accordance with an embodiment of the present invention.

FIG. 8 is a flowchart depicting operations for facilitating data-locality-aware task scheduling on a hyper-converged infrastructure, in accordance with an embodiment of the present invention. More specifically, FIG. 8 is a flowchart depicting operations 500 of connector logic 144 on hyper-converged infrastructure 110 in computing environment 100.

Connector logic 144 identifies an I/O request from scheduling logic 134. In response to receiving the I/O request, connector logic 144 identifies data referenced in the I/O request either from the I/O request directly or by querying one or more resources of hyper-converged infrastructure 110 for such data (502). In some embodiments, the I/O requests represent a plurality of "map" input steps or a plurality of "reduce" output steps of a MapReduce job. In general, the I/O request can relate to any type of I/O operation on data storage devices 152 that can be divided into tasks that are distributed among various nodes of physical nodes 150 and executed in parallel. In the embodiment depicted in FIG. 4, as well as other embodiments of the present invention, hyper-converged infrastructure includes multiple virtualized resource clusters that can submit I/O requests via respective instances of scheduling logic 134 simultaneously. Accordingly, connector logic 144 can execute multiple instances of operations 500, in parallel, to facilitate data-locality-aware task scheduling on a plurality of virtualized resource clusters of hyper-converged infrastructure 110.

To determine where distributed file system 140 stores the data referenced in the I/O request, connector logic 144 queries distributed file system API 142 for one or more block-location mapping tables based on the referenced data (e.g., based on one or more file and/or block identifiers referenced in the I/O request; 504). As discussed with respect to FIG. 7B, the block-location mapping table(s) can identify the physical nodes that store each replica of each block of data referenced in the I/O request. In some embodiments, connector logic 144 scans any block-location mapping tables identified as a result of querying distributed file system 140 (504) to generate, or otherwise identify, a queue of blocks that represents the data referenced in the I/O request (506).

While distributed file system 140 can provide connector logic 144 with data-locality information for the data referenced in the I/O request, this data-locality information is transparent to scheduling logic 134 executing within an abstracted user-space (i.e., a container). To make the data-locality information available to scheduling logic 134, connector logic 144 maps each block of data to one or more respective physical nodes that store the block (e.g., the physical nodes that store each replica of the block of data) and maps the physical nodes to the containers deployed thereon.

In the embodiment depicted in FIG. 8, connector logic 144 selects a block of data from the queue of blocks that represents the data referenced in the I/O request (508) and identifies the physical node(s) that store the selected block of data (e.g., the physical nodes that store replicas of the block of data) based on the identified block-location mapping table(s). To determine how containers are deployed on the identified physical node(s) connector logic 144 queries for one or more container-instance mapping tables that describe how containers are presently deployed on physical nodes 150 (510). Connector logic 144 scans any container-instance mapping tables identified as a result of the query (512). More specifically, connector logic 144 scans the identified container-instance mapping table(s) using one or more identifiers that are associated with the physical nodes that store the selected block of data. If, for example, the selected block of data is the first block of the first file depicted in FIGS. 7A and 7B (i.e., "File1_Block1"), connector logic 144 can scan block-location mapping table 400 to determine that "node1" (i.e., node 1) stores the first replica (i.e., F1_B1_R1), that "node2" (i.e., node 2) stores the second replica (i.e., F1_B1_R2), and that "Node4" (i.e., node 4) stores the third replica (i.e., F1_B1_R3). Connector logic 144 can then scan a container-instance mapping table that is analogous to container-instance mapping table 310 using the node IDs "Node1", "Node2", and "Node4" to identify the containers that are deployed on node 1, node 2, and node 4.

As a result of scanning the container-instance mapping table(s) (512), connector logic 144 identifies containers having data-locality with the selected block of data (514). In embodiments that facility data-locality aware task scheduling among multiple virtualized resources clusters, it is necessary to identify the containers (i) that have data-locality with the selected block of data and (ii) that are associated with the virtualized resource cluster that submitted the I/O request via a respective instance of scheduling logic 134. Scanning container-instance mapping table 310 for "Node1," for example, will identify both "Node1_contain1" (i.e., container 1) and "Node1_contain2" (i.e., container 2) as containers that are deployed on node 1. In the embodiments depicted in FIGS. 4-8, however, virtual resource cluster 1 and virtual resource cluster 2 are deployed on hyper-converged infrastructure 110, as shown in container-instance mapping table 310 by the association between "Node1_contain1" (i.e., container 1) and "Node1_contain2" (i.e., container 2) and the directories "/cluster1" (i.e., virtualized resource cluster 1) and "/cluster2" (i.e., virtualized resource cluster 2) respectively. In general, connector logic 144 is able to identify the container that submitted, via scheduling logic 134, the I/O request. Connector logic 144 can identify "valid container(s)" having data-locality with the selected block of data using the identity of the container that submitted the I/O request and one or more container-instance mapping tables (516). If, for example, connector logic 144 received the I/O request from container 1 via connecter 1, as depicted in FIG. 5, connector logic 144 can identify "Node1_contain1" (i.e., container 1), "Node2_contain1" (i.e., container 3), and notionally, "Node4_contain1" (i.e., a node ID representing a notional "container 7" that is associated with the "/cluster1" directory) as valid containers having data-locality with the first block of the first file (i.e., File1_Block1). Conversely, "Node1_contain2" (i.e., container 2) and "Node2_contain2" (i.e., container 4) are invalid containers in this example because they are associated with the directory "/cluster2" (i.e., virtualized resource cluster 2) in container-instance mapping table 310. In the embodiment depicted in FIG. 8, connector logic 144 generates and updates a list of valid containers and the associated blocks of data for the data referenced in the I/O request (518).

To identify valid containers having data locality with each block of data associated with the I/O request, connector logic 144 removes the selected data block from the queue (520), and in response to determining that blocks of data remain in the queue (decision 522, YES branch), connector logic 144 selects another block of data from the queue and performs another iteration of operations 508-520. If connector logic 144 determines that no data blocks remain in the queue (decision 522, NO branch), connector logic 144 provides, via parallel processing logic API 132, the list of valid containers having data-locality with the data referenced in the I/O request to the instance of scheduling logic 134 that submitted the I/O request (524). The list of valid containers enables scheduling logic 134 to identify, for each task associated with the I/O request, one or more containers that have data-locality with the data required to execute the respective task. Scheduling logic 134 can therefore schedule tasks over containers deployed on physical nodes 150 based on data-locality aware task scheduling.

Figure 9:
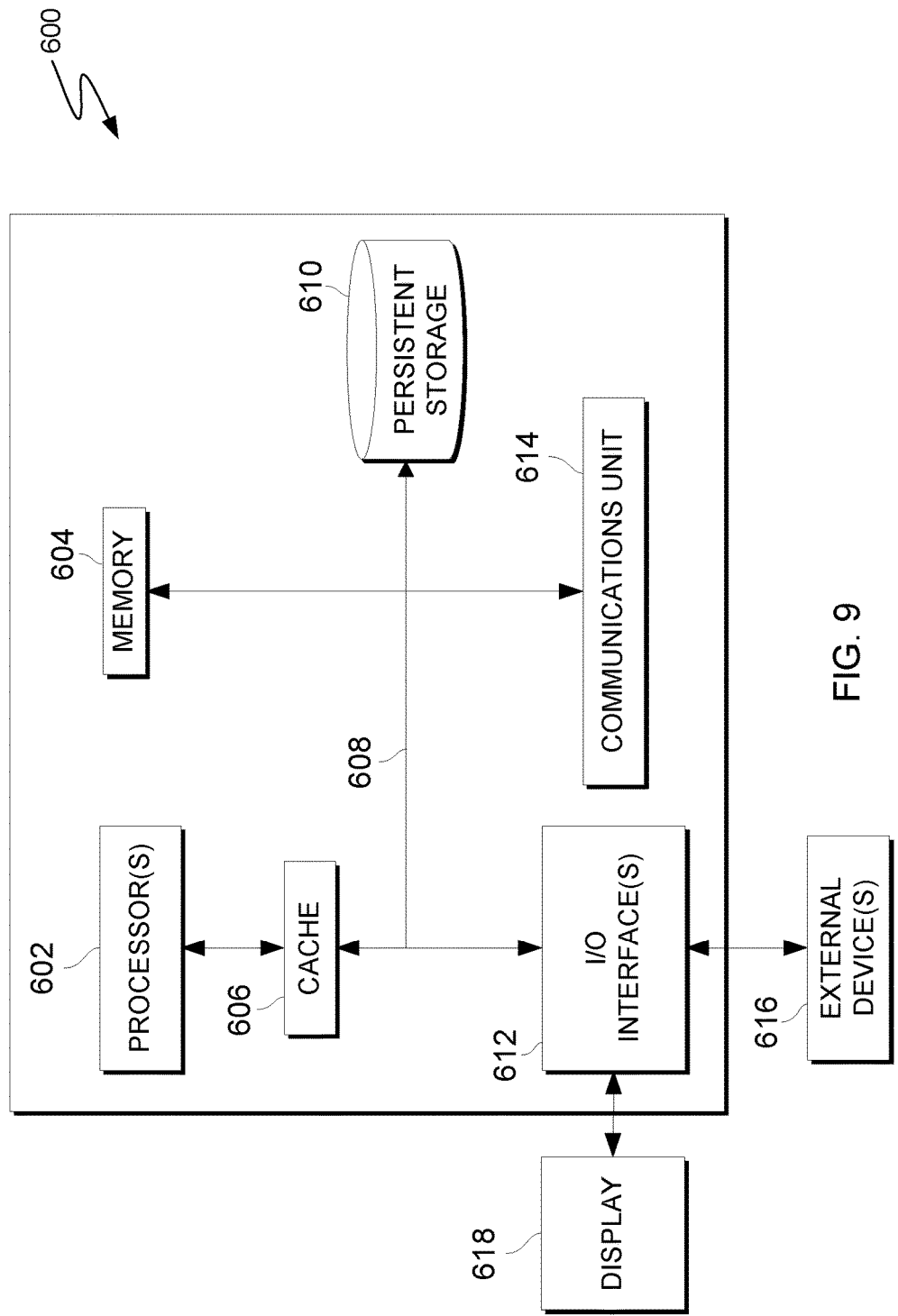
FIG. 9 is a block diagram of components of a computing device executing operations for facilitating data-locality-aware task scheduling, in accordance with an embodiment of the present invention.

FIG. 9 is a block diagram of components of a computing device, generally designated 600, in accordance with an embodiment of the present invention. In one embodiment, computing system 600 is representative of one or more nodes of physical nodes 150 within computing environment 100, in which case computing system includes one or more of the features described with respect to FIGS. 3-8.

It should be appreciated that FIG. 9 provides only an illustration of one implementation and does not imply any limitations with regard to the environments in which different embodiments may be implemented. Many modifications to the depicted environment may be made.

Computing system 600 includes processor(s) 602, cache 606, memory 604, persistent storage 610, input/output (I/O) interface(s) 612, communications unit 614, and communications fabric 608. Communications fabric 608 provides communications between cache 606, memory 604, persistent storage 610, communications unit 614, and input/output (I/O) interface(s) 612. Communications fabric 608 can be implemented with any architecture designed for passing data and/or control information between processors (such as microprocessors, communications and network processors, etc.), system memory, peripheral devices, and any other hardware components within a system. For example, communications fabric 608 can be implemented with one or more buses or a crossbar switch.

Memory 604 and persistent storage 610 are computer readable storage media. In this embodiment, memory 604 includes random access memory (RAM). In general, memory 604 can include any suitable volatile or non-volatile computer readable storage media. Cache 606 is a fast memory that enhances the performance of processor(s) 602 by holding recently accessed data, and data near recently accessed data, from memory 604.

Program instructions and data used to practice embodiments of the present invention may be stored in persistent storage 610 and in memory 604 for execution by one or more of the respective processor(s) 602 via cache 606. In an embodiment, persistent storage 610 includes a magnetic hard disk drive. Alternatively, or in addition to a magnetic hard disk drive, persistent storage 610 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 610 may also be removable. For example, a removable hard drive may be used for persistent storage 610. Other examples include optical and magnetic disks, thumb drives, and smart cards that are inserted into a drive for transfer onto another computer readable storage medium that is also part of persistent storage 610.

Communications unit 614, in these examples, provides for communications with other data processing systems or devices. In these examples, communications unit 614 includes one or more network interface cards. Communications unit 614 may provide communications through the use of either or both physical and wireless communications links. Program instructions and data used to practice embodiments of the present invention may be downloaded to persistent storage 610 through communications unit 614.

I/O interface(s) 612 allows for input and output of data with other devices that may be connected to computer system 600. For example, I/O interface(s) 612 may provide a connection to external device(s) 616 such as a keyboard, keypad, a touch screen, and/or some other suitable input device. External device(s) 616 can also include portable computer readable storage media such as, for example, thumb drives, portable optical or magnetic disks, and memory cards. Software and data used to practice embodiments of the present invention can be stored on such portable computer readable storage media and can be loaded onto persistent storage 610 via I/O interface(s) 612. I/O interface(s) 612 also connect to display 618.

Display 618 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for facilitating data-locality-aware task scheduling on hyper-converged computing infrastructures, comprising:
    identifying, by one or more computer processors, a plurality of data blocks referenced in an input/output (I/O) request that is based on scheduling logic that executes within a container that is deployed on a hyper-converged infrastructure;
    scanning, by one or more computer processors, a block-location mapping table using a data block identifier that is associated with a present data block of the plurality of data blocks, and in response, identifying, by one or more computer processors, one or more physical nodes of the hyper-converged infrastructure that store the present data block;
    scanning, by one or more computer processors, a container-instance mapping table using one or more respective physical node identifiers that are associated with the one or more physical nodes that store the present data block, and in response, identifying, by one or more computer processors, one or more containers that are deployed on the one or more physical nodes that store the present data block; and
    providing, by one or more compute processors, the scheduling logic with a list of one or more container identifiers that are respectively associated with the one or more one or more containers that are deployed on the one or more physical nodes that store the present data block.

2. The method of claim 1, further comprising:
    identifying, by one or more computer processors, valid containers among the one or more containers that are deployed on the one or more physical nodes that store the present data block based on a cluster identifier that is associated with a cluster of containers that includes the container in which the scheduling logic executes, wherein the list is a list of valid containers.

3. The method of claim 1, further comprising:
    identifying, by one or more computer processors, a plurality of target physical nodes from among the one or more physical nodes of the hyper-converged infrastructure;
    preparing, by one or more computer processors, a plurality of containers for deployment on respective nodes of the plurality of target physical nodes;
    deploying, by one or more computer processors, the plurality of containers on the plurality of target physical nodes; and
    generating, by one or more computer processors, the container-instance mapping table, wherein the container-instance mapping table associates each container of the plurality of containers with a respective target physical node of the plurality of target physical nodes.

4. The method of claim 3, wherein the container-instance mapping table associates each container of the plurality of containers with a respective virtualized resource cluster.

5. The method of claim 1, further comprising:
    for each physical node of the one or more physical nodes of the hyper-converged infrastructure that hosts at least one container, generating, by one or more computer processors, a log of processes executed by one or more hosted containers;
    for each physical node of the one or more physical nodes of the hyper-converged infrastructure that hosts at least one container, identifying, by one or more computer processors, the one or more hosted containers based on the log of processes; and
    generating, by one or more computer processors, the container-instance mapping table, wherein the container-instance mapping table includes identifiers that are associated with the hosted containers and wherein the container-instance mapping table maps the hosted containers to the one or more physical nodes of the hyper-converged infrastructure that host at least one container.

6. The method of claim 1, further comprising:
    storing, by one or more computer processors, the present data block on the one or more physical nodes of the hyper-converged infrastructure using a portable operating system interface (POSIX) compliant file system, wherein the I/O request is generated by one or more instances of an application that (i) utilize a virtualized, distributed file system and (ii) execute within respective containers of a plurality of containers that are deployed on the hyper-converged infrastructure.

7. The method of claim 1, wherein the I/O request represents, at least in part, a MapReduce job.

8. A computer program product for facilitating data-locality-aware task scheduling on hyper-converged computing infrastructures, the computer program product comprising:
- a computer readable storage medium and program instructions stored on the computer readable storage medium, the program instructions comprising:
- program instructions to identify a plurality of data blocks referenced in an input/output (I/O) request that is based on scheduling logic that executes within a container that is deployed on a hyper-converged infrastructure;
- program instructions to scan a block-location mapping table using a data block identifier that is associated with a present data block of the plurality of data blocks, and in response, identify one or more physical nodes of the hyper-converged infrastructure that store the present data block;
- program instructions to scan a container-instance mapping table using one or more respective physical node identifiers that are associated with the one or more physical nodes that store the present data block, and in response, identify one or more containers that are deployed on the one or more physical nodes that store the present data block; and
- program instructions to provide the scheduling logic with a list of one or more container identifiers that are respectively associated with the one or more one or more containers that are deployed on the one or more physical nodes that store the present data block.

9. The computer program product of claim 8, the program instructions further comprising:
- program instructions to identify valid containers among the one or more containers that are deployed on the one or more physical nodes that store the present data block based on a cluster identifier that is associated with a cluster of containers that includes the container in which the scheduling logic executes, wherein the list is a list of valid containers.

10. The computer program product of claim 8, the program instructions further comprising:
- program instructions to identify a plurality of target physical nodes from among the one or more physical nodes of the hyper-converged infrastructure;
- program instructions to prepare a plurality of containers for deployment on respective nodes of the plurality of target physical nodes;
- program instructions to deploy the plurality of containers on the plurality of target physical nodes; and
- program instructions to generate the container-instance mapping table, wherein the container-instance mapping table associates each container of the plurality of containers with a respective target physical node of the plurality of target physical nodes.

11. The computer program product of claim 10, wherein the container-instance mapping table associates each container of the plurality of containers with a respective virtualized resource cluster.

12. The computer program product of claim 8, the program instructions further comprising:
- program instructions to generate, for each physical node of the one or more physical nodes of the hyper-converged infrastructure that hosts at least one container a log of processes executed by one or more hosted containers;
- program instructions to identify, for each physical node of the one or more physical nodes of the hyper-converged infrastructure that hosts at least one container, the one or more hosted containers based on the log of processes; and
- program instructions to generate the container-instance mapping table, wherein the container-instance mapping table includes identifiers that are associated with the hosted containers and wherein the container-instance mapping table maps the hosted containers to the one or more physical nodes of the hyper-converged infrastructure that host at least one container.

13. The computer program product of claim 8, the program instructions further comprising:
- program instructions to store the present data block on the one or more physical nodes of the hyper-converged infrastructure using a portable operating system interface (POSIX) compliant file system, wherein the I/O request is generated by one or more instances of an application that (i) utilize a virtualized, distributed file system and (ii) execute within respective containers of a plurality of containers that are deployed on the hyper-converged infrastructure.

14. The computer program product of claim 8, wherein the I/O request represents, at least in part, a MapReduce job.

15. A computer system for facilitating data-locality-aware task scheduling, the computer system comprising:
- one or more computer processors;
- one or more computer readable storage media;
- program instructions stored on the one or more computer readable storage media for execution by at least one of the one or more processors, the program instructions comprising:
- program instructions to identify a plurality of data blocks referenced in an input/output (I/O) request that is based on scheduling logic that executes within a container that is deployed on a hyper-converged infrastructure;
- program instructions to scan a block-location mapping table using a data block identifier that is associated with a present data block of the plurality of data blocks, and in response, identify one or more physical nodes of the hyper-converged infrastructure that store the present data block;
- program instructions to scan a container-instance mapping table using one or more respective physical node identifiers that are associated with the one or more physical nodes that store the present data block, and in response, identify one or more containers that are deployed on the one or more physical nodes that store the present data block; and
- program instructions to provide the scheduling logic with a list of one or more container identifiers that are respectively associated with the one or more one or more containers that are deployed on the one or more physical nodes that store the present data block.

16. The computer system of claim 15, the program instructions further comprising:
- program instructions to identify valid containers among the one or more containers that are deployed on the one or more physical nodes that store the present data block based on a cluster identifier that is associated with a cluster of containers that includes the container in which the scheduling logic executes, wherein the list is a list of valid containers.

17. The computer system of claim 15, the program instructions further comprising:
- program instructions to identify a plurality of target physical nodes from among the one or more physical nodes of the hyper-converged infrastructure;

program instructions to prepare a plurality of containers for deployment on respective nodes of the plurality of target physical nodes;
program instructions to deploy the plurality of containers on the plurality of target physical nodes; and
program instructions to generate the container-instance mapping table, wherein the container-instance mapping table associates each container of the plurality of containers with a respective target physical node of the plurality of target physical nodes.

18. The computer system of claim 17, wherein the container-instance mapping table associates each container of the plurality of containers with a respective virtualized resource cluster.

19. The computer system of claim 15, the program instructions further comprising:
program instructions to generate, for each physical node of the one or more physical nodes of the hyper-converged infrastructure that hosts at least one container a log of processes executed by one or more hosted containers;
program instructions to identify, for each physical node of the one or more physical nodes of the hyper-converged infrastructure that hosts at least one container, the one or more hosted containers based on the log of processes; and
program instructions to generate the container-instance mapping table, wherein the container-instance mapping table includes identifiers that are associated with the hosted containers and wherein the container-instance mapping table maps the hosted containers to the one or more physical nodes of the hyper-converged infrastructure that host at least one container.

20. The computer system of claim 15, the program instructions further comprising:
program instructions to store the present data block on the one or more physical nodes of the hyper-converged infrastructure using a portable operating system interface (POSIX) compliant file system, wherein the I/O request is generated by one or more instances of an application that (i) utilize a virtualized, distributed file system and (ii) execute within respective containers of a plurality of containers that are deployed on the hyper-converged infrastructure.

* * * * *